United States Patent [19]

Nakamura et al.

[11] 4,166,166

[45] Aug. 28, 1979

[54] PROCESS FOR PRODUCING ACETOPHENONE-MODIFIED PHENOLIC RESIN

[75] Inventors: Nobutaka Nakamura; Yukio Saeki, both of Fujieda, Japan

[73] Assignee: Sumitomo Durez Company, Ltd., Tokyo, Japan

[21] Appl. No.: 948,065

[22] Filed: Oct. 2, 1978

[30] Foreign Application Priority Data

Oct. 18, 1977 [JP] Japan .................................. 52/124075

[51] Int. Cl.$^2$ ........................... C08G 8/02; C08G 8/26
[52] U.S. Cl. ......................................... 528/126; 260/7;
260/29.3; 260/32.8 R; 260/33.4 R; 428/473;
428/529; 528/127
[58] Field of Search ................................. 528/126, 127

[56] References Cited

U.S. PATENT DOCUMENTS

| | | | |
|---|---|---|---|
| 2,241,422 | 5/1941 | Rosenblum | 528/127 X |
| 2,960,494 | 11/1960 | Lewis | 528/165 |
| 3,351,605 | 11/1976 | Harvey | 528/146 X |
| 3,390,127 | 6/1968 | Schick et al. | 528/127 |
| 3,862,089 | 1/1975 | Shinohara et al. | 528/155 |
| 4,018,739 | 4/1977 | Okamoto et al. | 528/145 X |

OTHER PUBLICATIONS

Chem. Abstracts, vol. 75, 1971, 6869k, Penfold et al.

*Primary Examiner*—Howard E. Schain
*Attorney, Agent, or Firm*—Peter F. Casella; James F. Mudd

[57] ABSTRACT

Phenolic novolak resins are produced from acetophenone, particularly by-product acetophenone obtained from the cumene process for manufacturing phenol, by the process of (1) reacting acetophenone with an aldehyde under alkaline conditions, and (2) reacting the product of step (1) with a phenol under acidic conditions. Phenolic resole resins are produced by reacting the product of step (2) with an aldehyde under alkaline conditions. The acetophenone modified phenolic resins are useful as a molding material, a felting or batting binder, a grinding stone binder, a foundry sand binder and an adhesive for timbers.

14 Claims, No Drawings

PROCESS FOR PRODUCING ACETOPHENONE-MODIFIED PHENOLIC RESIN

BACKGROUND OF THE INVENTION

The present invention relates to a process for producing acetophenone-modified phenolic resin, and its object is to provide a modified phenolic resin which is inexpensive and is provided with a satisfactory thermosetting property.

Thermosetting phenolic resins are generally obtained as products of reaction between phenols such as phenol or cresol and aldehydes such as formaldehyde or acetaldehyde in an acidic or alkaline condition. Structurally the phenolic resins are classified as novolak resins and resol resins. Novolak resins are obtained by a reaction of phenol or cresol with formaldehyde generally conducted in the presence of an acidic catalyst, wherein the reaction product has a linear structure as represented by the following reaction formulas:

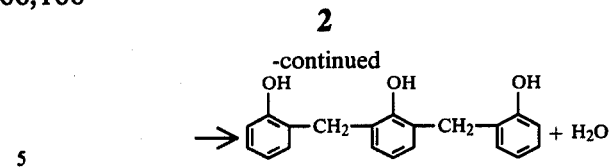

As shown above the reaction proceeds by the repetition of addition and condensation to provide a resinous product, which is a mixture of di- to deca-condensate of phenolic compounds (m.w. 200–1300) with an average of hexa-condensate of phenolic compounds, which is solid at room temperature, soluble in alcohol or other solvents and easily melted by heating. Novolak phenolic resins are not hardened by heating and require, for hardening, the use of a hardener which is usually hexamethylenetetramine (hereinafter referred to as hexamine). On the other hand resol resins are obtained by a reaction of phenol or cresol with formaldehyde in an alkaline condition according to the following formulas:

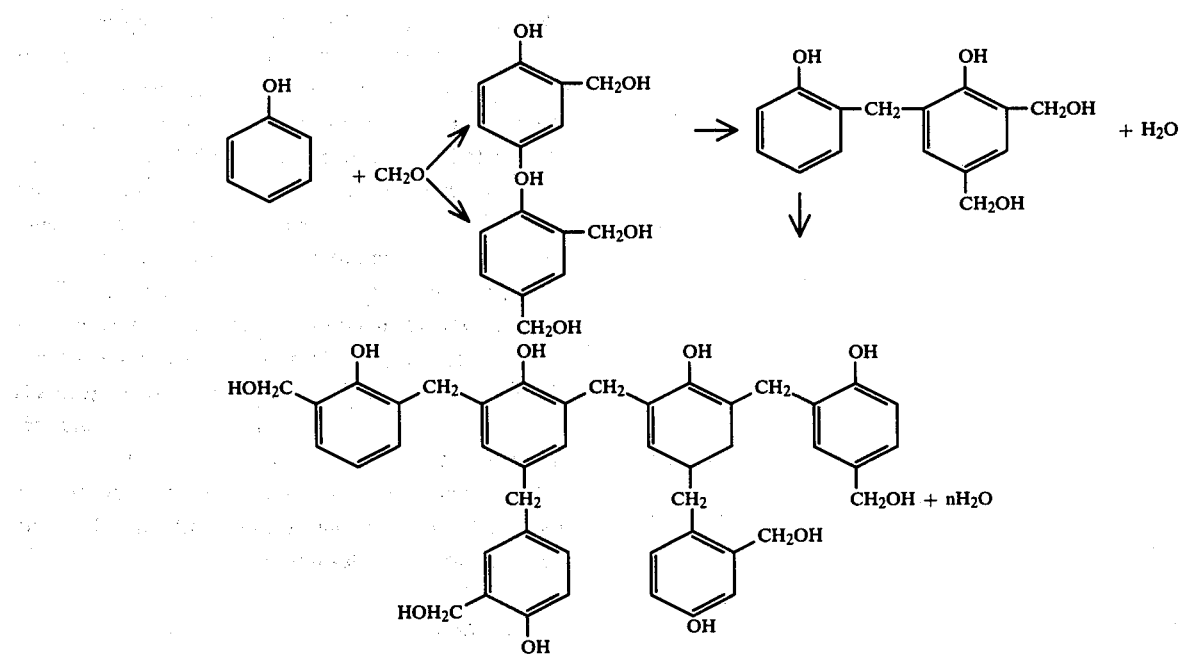

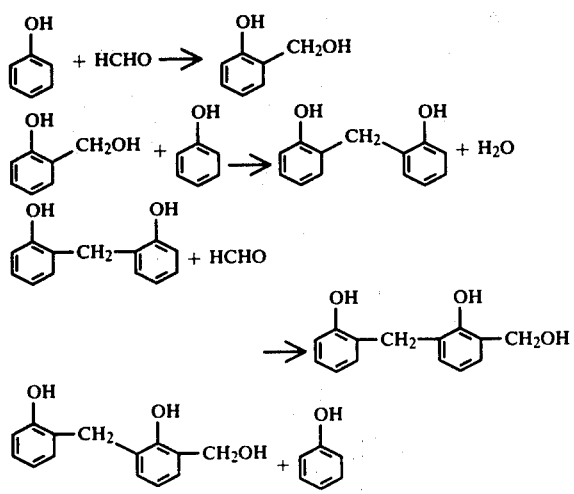

The reaction is initiated by the addition of formaldehyde to phenol and proceeds by condensation and addition reactions to obtain a mixture of di- to pentadecan-condensate phenolic compounds. In contrast to novolak resins, resol resins are hardened by heating due to the presence of crosslinkable methylol radicals at the arbitrary terminals of molecules.

Phenols, which are the principal raw material for phenolic resins, can be produced by coal tar fractionation or by processes starting from petroleum such as the benzene sulfonation process, the cumene process or the chlorobenzene process. Most of the present phenols are synthetically obtained by the latter processes using petroleum derived products. It is usual that phenols of a relatively high purity are generally used for the production of phenolic resins. However, the significant surge of petroleum price in recent years has resulted in an increase in the price of phenols derived from petroleum, and the resulting increase in the manufacturing cost of phenolic resins has reached a situation wherein phenolic resins, which have been accepted as inexpensive and durable thermosetting resins, are no longer applicable for certain purposes because of economic consideration. In order to reduce the manufacturing cost of the phenolic resins, therefore, it has been contemplated to replace a part of phenols with another inexpensive material, and such approach is undoubtedly desirable also from the standpoint of effective utilization of petroleum resources.

As a result of exploratory research based on such economic and social background, we have succeeded in obtaining inexpensive and still satisfactorily thermosetting phenolic resins by employing a scarcely utilized by-product obtained in phenol production by the cumene process which principally consists of acetophenone, and reacting it in a particular manner during the course of phenolic resin preparation. The by-product obtained in phenol production by the cumene process is composed of about 70 to 90 weight percent of acetophenone, about 5 to 10 weight percent of phenol and trace amounts of cresol, xylenol, α-methylstyrene, dimethylphenylcarbinol, etc. The reaction of acetophenone with formaldehyde is reported in a prior reference (S. G. Morgan, Chemistry and Industry, 1938), but no report of it concerning the modification of phenolic resins is found.

SUMMARY OF THE INVENTION

The present invention is characterized by a reaction of acetophenone with an aldehyde under alkaline condition followed by a reaction with a phenol under acidic conditions to obtain a novolak resin, and also by a further reaction with an aldehyde under alkaline conditions to obtain a resol resin.

DESCRIPTION OF EMBODIMENTS

The reactions according to the present invention may be separated into three steps.

The first step consists of a reaction of acetophenone and formaldehyde. The addition reaction of formaldehyde to a benzene ring generally hardly proceeds since the acetyl radical in acetophenone attracts electrons from the benzene ring. However the present inventors have found that formaldehyde can be reacted with the acetyl radical of acetophenone if the reaction of acetophenone and formaldehyde is initiated in an alkaline condition with a pH value not lower than 8, preferably 8.5 or higher.

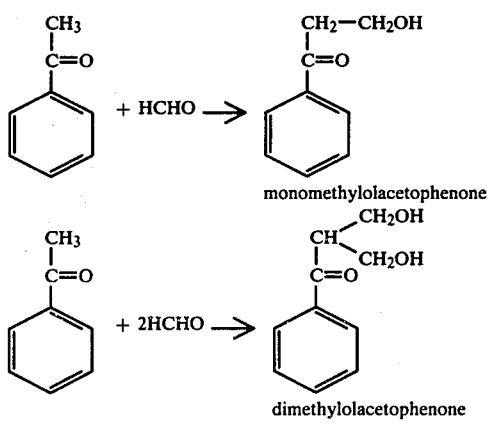

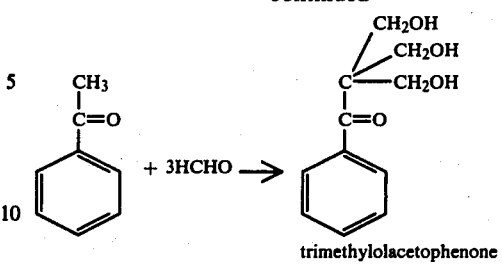

trimethylolacetophenone

It has also been found that the above-mentioned methylolation becomes extremely slow at a pH lower than 8. The molar ratio of acetophenone to formaldehyde for the charge is preferably within a range from 1 to 4.

The alkaline catalyst to be employed in the reaction of acetophenone and formaldehyde according to the present invention can be a hydroxide or a salt of an alkali metal or an alkali earth metal such as sodium hydroxide, barium hydroxide, sodium carbonate or calcium hydroxide, but the most preferred found were triethylamine, triethanolamine or a mixture thereof. In contrast to hydroxides and salts of alkali and alkali earth metals which generally result in a lowering of alkalinity during the course of reaction, triethylamine and triethanolamine were found to be capable of stabilizing the pH during the reaction, and thus improving the yield of reaction. The formation of methylolacetophenones are generally completed within 1-3 hours at a temperature of 80°-100° C., and the reaction product is generally considered as a mixture of mono-, di- and trimethylolacetophenone as already explained.

The second step consists of a reaction of the methylolacetophenones thus obtained with phenol according to the following formulas:

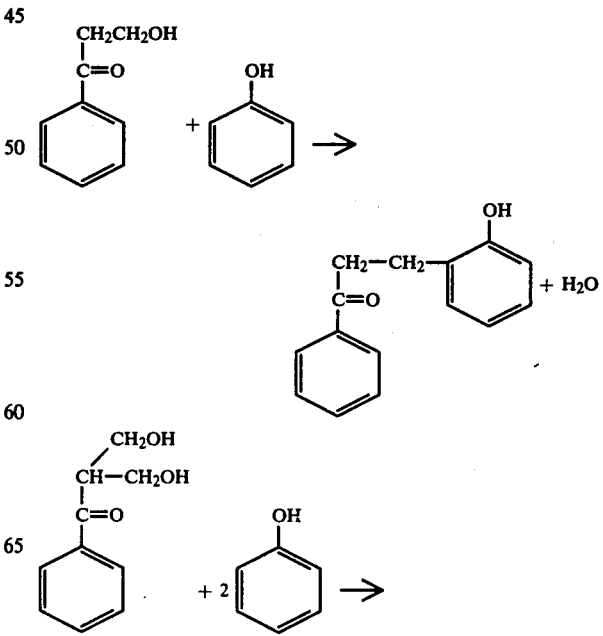

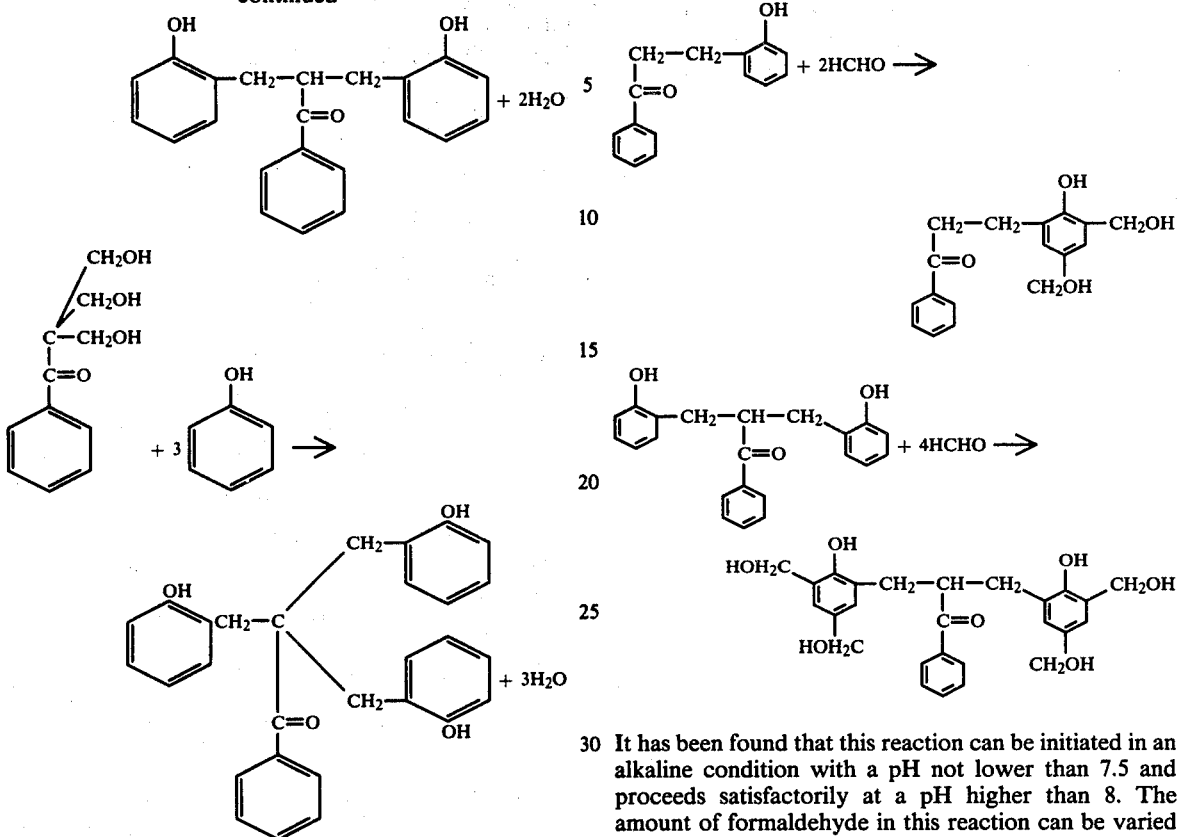

Although it has been found that the above-shown reaction proceeds to a certain degree even in an alkaline condition with a pH higher than 9, it proceeds more readily in an acidic condition, particularly in a strongly acidic condition with a pH lower than 2. The molar ratio of acetophenone to phenol for this reaction can be varied but is generally kept within a range from about 0.05 to 5. Various suitable phenolic resins are obtained by first selecting the appropriate molar ratio of acetophenone to phenol in the second step, then in response to said molar ratio determine the molar ratio of acetophenone to formaldehyde in the first step.

The acidic catalyst applicable in the present invention is not particularly limited so that generally sulfuric acid, hydrochloric acid, oxalic acid, formic acid or p-toluenesulfonic acid are used. The reaction time and temperature can be varied but are generally within 0.5–5 hours at a temperature of about 80° to 100° C., and the resulting product is considered to be a mixture of the aforementioned co-condensates. The acetophenone-modified novolak resin can be obtained by further heating and then dehydrating said condensates to obtain a solid product.

In order to obtain resol resins, the above-mentioned condensate is converted to the alkaline state and reacted with formaldehyde in the third step according to the following formulas:

It has been found that this reaction can be initiated in an alkaline condition with a pH not lower than 7.5 and proceeds satisfactorily at a pH higher than 8. The amount of formaldehyde in this reaction can be varied and is determined according to the purpose for using the resin.

The alkaline catalyst applicable in the third step of the present invention is not particularly limited and generally sodium hydroxide, potassium hydroxide, sodium carbonate, barium hydroxide, ammonia or triethylamine are used. The reaction product may be used as produced or dehydrated or with a solvent such as methanol, acetone or methylethylketone. Also the product may be used in liquid state or in solid state obtained by dehydration.

The acetophenone-modified novolak phenolic resins and acetophenone-modified resol phenolic resins thus obtained are provided with properties, particularly durability, comparable to those of conventional phenolic resins. The acetophenone-modified phenolic resins of the present invention are generally usable as a molding material, a felting or batting binder, a grinding stone binder, a foundry sand binder and an adhesive for timbers.

Phenol in the present invention can be effectively substituted by alkyl-substituted phenols wherein the alkyl groups have 1 to about 6 carbon atoms and are preferably substituted in the meta positions to avoid inhibiting polymerization. Suitable phenols include such as cresol, xylenol and the like, and polyhydroxy phenols, such as resorcinol and the like. Also formaldehyde in the present invention can be effectively substituted by other aldehydes having up to 6 carbon atoms, such as acetaldehyde, furfural or particularly paraformaldehyde.

The present invention will be further clarified by the following non-limitative examples, wherein the quantities are represented by parts by weight unless otherwise specified.

EXAMPLE 1

150 Parts of acetophenone, 303 parts of formalin (37% formaldehyde) (molar ratio of formaldehyde/acetophenone: 3.0) and 6 parts of 50% aqueous solution of sodium hydroxide were charged to a reactor. The mixture, having a pH of 11.0, was heated under reflux at 100° C. for 3 hours. After cooling it were added 235 parts of phenol (molar ratio of phenol/acetophenone: 2.0) and 16 parts of paratoluenesulfonic acid. The resulting mixture, having a pH of 1.0, was heated under reflux at 100° C. for 3 hours and dehydrated to obtain an acetophenone-modified novolak resin in solid state (resin I), which showed the following properties:

| | |
|---|---|
| Melting point (°C./capillary method) | 90 |
| Gelation time (sec/hexamine 10% addition; 150° C. hot plate method) | 80 |
| Flow (mm/hexamine 10% addition; inclined plate method) | 30 |
| Acetone extraction (%/hexamine 10% addition; heated at 150° C., 1 hr.) | 0.2 |

EXAMPLE 2

150 Parts of a by-product from the cumene process (consisting of 80% of acetophenone, 10% of phenol and 10% of other compounds), 200 parts of formalin (37% formaldehyde, molar ratio of formaldehyde/acetophenone: 2.5) and 10 parts of triethylamine were charged to a reactor. The mixture, having a pH of 9.0, was heated under reflux at 80° C. for 5 hours, then cooled. To the mixture were added 124 parts of phenol (molar ratio of phenol/acetophenone: 1.5/1) and 23 parts of 25% sulfuric acid. The resulting mixture, having a pH of 0.5, was heated under reflux at 100° C. for 5 hours and dehydrated to obtain 309 parts of a solid resin, with a yield of 61% with respect to the total charged amount. The acetophenone-modified novolak resin (resin II) thus obtained showed the following properties:

| | |
|---|---|
| Melting point (°C./capillary method) | 85 |
| Gelation time (sec/hexamine 10% addition; 150° C. hot plate method) | 85 |
| Flow (mm/hexamine 10% addition; inclined plate method) | 40 |
| Acetone extraction (%/hexamine 10% addition; heating 150° C., 1 hr.) | 0.2 |

Also the above-mentioned process of Example 2 was reproduced except that the triethylamine used as the catalyst in the reaction of the cumene process by-product and formalin was replaced by 6 parts of 50% aqueous solution of sodium hydroxide (initial pH: 10.8) to obtain 262 parts of resin, with a yield of 52% with respect to the total charged amount.

EXAMPLE 3

A mixture of resins I and II and a commercially available phenolic resin for felting binder, each previously mixed with 10% of hexamine, was added in a 30% amount to reclaimed wool (water content 7%) to obtain a fleece, which was then subjected to heat-forming at 180° C. for 5 minutes to obtain a hard felt board of a specific gravity of 0.8. The felt board thus obtained had the following bending strength and rate of acetone extraction:

| | I | II | Commercial Phenolic Resin |
|---|---|---|---|
| Bending strength (kg/cm$^2$) (JIS-A-5907) | 410 | 406 | 415 |
| Acetone Extraction (%) | 0.3 | 0.3 | 0.3 |

Thus the performance of resins I and II are close to that of commercially available phenolic resin.

In the above-mentioned test procedure JIS-A-5907, test specimens of the felt board were cut to size: 50 mm in width, and 24T+50 mm in length, where T equals thickness of specimen. The specimens were cut so the fibers run lengthwise in the specimen. The test specimen was supported across two one-centimeter radius edges spaced apart such that the span between the supporting edges can be 15 cm. To the middle to the speciment, a load was added with a one cm. radius heat at about 5 cm/minute (or 70 kg/minute). The maximum load is measured and the bending strength is calculated from the following formula:

Bending Strength=3PS/2WT$^2$ where
P=maximum load (kg)
S=span distance between support edges (cm)
W=width of specimen (cm)
T=thickness of specimen (cm)

The least value of the results available from several specimens is defined as the Bending Strength.

EXAMPLE 4

150 Parts of a by-product from the cumene process (consisting of 75% of acetophenone, 12% of phenol and 13% of other compounds), 264 parts of formalin (37% formaldehyde, molar ratio of formaldehyde/acetophenone: 3.5) and 14 parts of triethanolamine were charged to a reactor. The mixture, having a pH of 9.8, was heated under reflux at 100° C. for 2 hours, then cooled and to this were added 262 parts of phenol (molar ratio of phenol/acetophenone: 3) and 30 parts of 10% hydrochloric acid. The resulting mixture, having a pH of 1.5, was heated at 100° C. for 3 hours. After cooling there were added 10 parts of 50% aqueous solution of sodium hydroxide and then with 50 parts of formalin. The resulting mixture, having a pH of 10.5, was further heated under reflux at 100° C. for 30 minutes and cooled to obtain an acetophenone-modified resol resin in liquid state (resin III). The properties of said resin III and a commercially available phenolic resin are as follows:

| | III | Commercial Resin |
|---|---|---|
| Viscosity (poise/25°) | 3.0 | 3.0 |
| pH | 10.3 | 10.8 |
| Non-volatile matter | 49 | 49 |
| Gelation time (min/135° C. test tube) | 19 | 18 |
| Solubility in water (dilutable times/25° C.) | more than 49 | more than 49 |

Then these two resins were subjected to a plywood adhesion test under the following conditions:

| | |
|---|---|
| Glue formulation | Resin 100 parts<br>Walnut flour 5 parts |
| Composition | Lauan (2 mm thick; water content 7% max) × 3 ply |
| Spread | 30 g/(30 cm)$^2$ |

| -continued | |
|---|---|
| Cold press | 10 kg/cm², 30 minutes |
| Hot press | 135° C., 10 kg/cm², 5 minutes |

The results of the above-mentioned adhesion test according to JAS, Special Class, were as follows:

| (n = 12) | Resin III | Commercial Resin |
|---|---|---|
| Adhesion (kg/cm²) | 14.5 | 14.5 |
| Wood failure (%) | 85 | 80 |

From the foregoing results it was verified that the acetophenone-modified resol phenolic resin III had an adhering strength at least equal to commerically available phenolic resin for plywood.

The above-mentioned JAS test results were obtained as follows:

A specimen was cut which is 25 mm in width and 75 mm in length. A first notch is cut in one face of the specimen, which notch runs across the width of the specimen and is 25 mm from the end of the specimen. A second notch is cut in the opposite face of the specimen, which notch runs across the width of the specimen and is 25 mm from the end of the specimen opposite from the first notch.

The notched specimen of the plywood was boiled in hot water for 72 hours, cooled to ambient temperature by immersing in water at ambient temperature, and tested as follows.

With the load rate of 600 kg/min or less, the ends of the specimen were pulled in opposite directions until the specimen failed. The maximum load at failure is measured and adhesion is calculated from the formula:

Adhesion (kg/cm²) = P/BH where
P = maximum load at failure (kg)
B = width of specimen (cm)
H = distance between notches (cm)

Wood failure on the broken surface of the specimen is calculated from the formula:

Wood Failure (%) = B/A × 100 where
A = whole surface of adhesion
B = surface of wood failure

We claim:

1. A process for producing an acetophenone-modified novolak phenolic resin which comprises reacting acetophenone with an aldehyde under alkaline conditions, and reacting the resulting reaction product with a phenol under acidic conditions.

2. A process according to claim 1 wherein said reaction of acetophenone with an aldehyde is initiated under alkaline conditions with a pH value not lower than 8.

3. A process according to claim 2 wherein the alkaline catalyst employed in said reaction of acetophenone with an aldehyde is triethylamine, triethanolamine or a mixture thereof.

4. A process according to claim 2 wherein said reaction with a phenol is initiated under acidic conditions with a pH value not higher than 2.

5. A process according to claim 1 wherein said acetophenone is a by-product obtained in the cumene process for producing phenol.

6. A process according to claim 4 wherein the aldehyde is formaldehyde and the phenol is phenol.

7. The product of the process of claim 1.

8. A process for producing an acetophenone-modified resole phenolic resin which comprises (1) reacting acetophenone with an aldehyde under alkaline conditions, (2) reacting the product of step (1) with a phenol under acidic conditions, and (3) reacting the product of step (2) with an aldehyde under alkaline conditions.

9. A process according to claim 8 wherein said reaction of acetophenone with an aldehyde is initiated under alkaline conditions with a pH value not lower than 8.

10. A process according to claim 9 wherein the alkaline catalyst employed in said reaction of acetophenone with formaldehyde is triethylamine, triethanolamine or a mixture thereof.

11. A process according to claim 9 wherein said reaction with phenol is initiated under acidic conditions with a pH value not higher than 2.

12. A process according to claim 11 wherein the aldehyde is formaldehyde and the phenol is phenol.

13. A process according to claim 8 wherein said acetophenone is a by-product obtained in the cumene process for producing phenol.

14. The product of the process of claim 8.

* * * * *